Jan. 12, 1965 T. LERNER 3,165,703
CAPACITIVE TRANSDUCER CIRCUIT
Filed Nov. 9, 1961
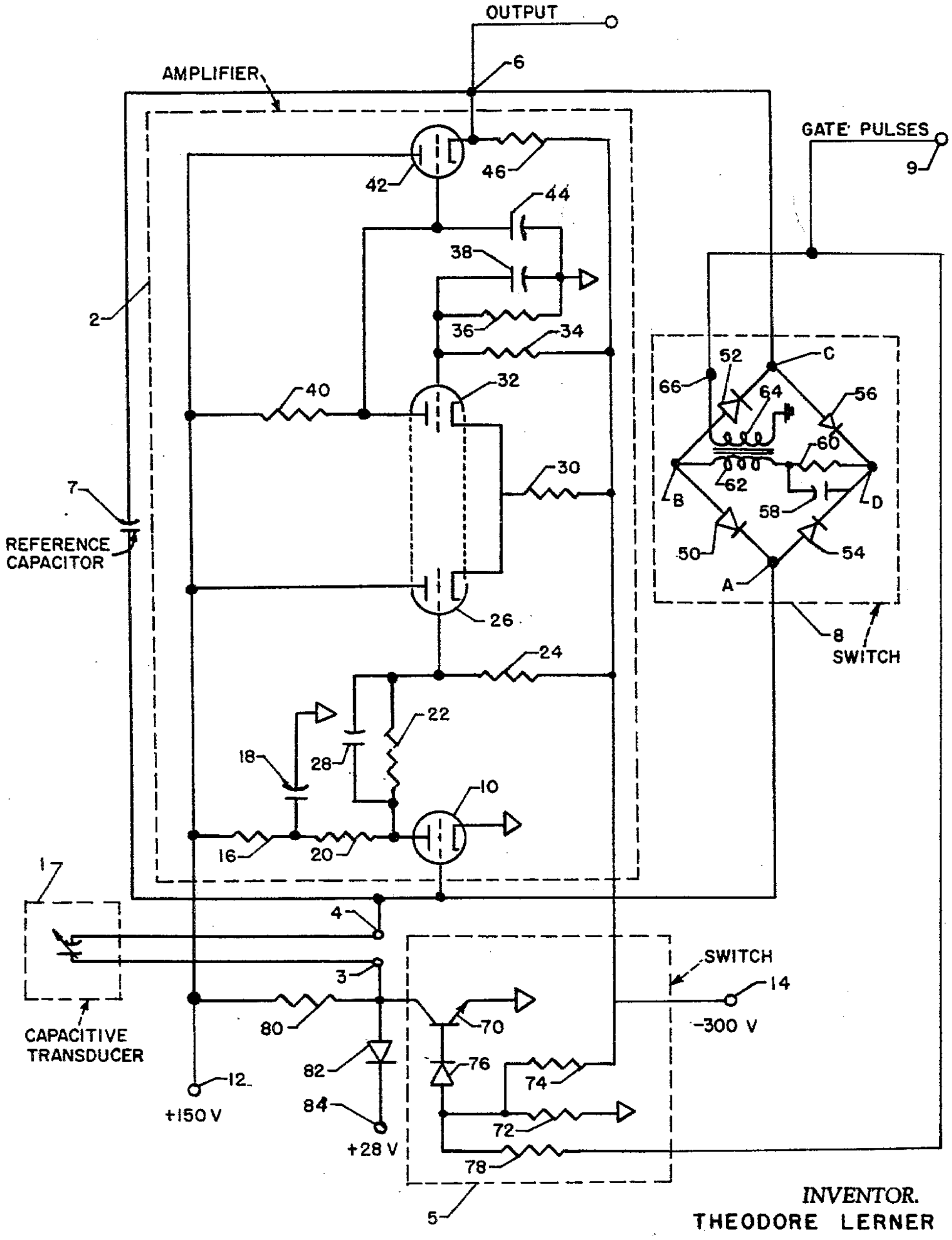
INVENTOR.
THEODORE LERNER
BY
Beau, Brooks, Buckley & Beau,
ATTORNEYS

3,165,703
CAPACITIVE TRANSDUCER CIRCUIT

Theodore Lerner, Amherst, N.Y., assignor to Bell Aerospace Corporation, Wheatfield, N.Y.

Filed Nov. 9, 1961, Ser. No. 151,225
12 Claims. (Cl. 328—127)

This invention relates to circuits for use with capacitive transducers, and in particular relates to a circuit which, when coupled to a capacitive transducer, provides an output potential which is proportional to the capacity at the transducer, and hence proportional to the position of the transducer.

It is a principal object of this invention to provide an improved circuit employing a novel approach to the problem of converting positional information at a capacitive transducer into an output voltage which is proportional to such position.

It is another important object of the present invention to provide a circuit which is relatively insensitive to supply voltage variations and to aging of the electronic components in the circuit, the present circuit providing an output voltage which is proportional to the ratio of the capacity of the transducer to the capacity of a fixed condenser, and this ratio being multiplied by a constant factor which is represented by a fixed reference potential applied to the circuit.

It is another object of the invention to provide a novel circuit employing electronic gate means which are controlled by a continuous chain of spaced pulses which alternatively open and close the gate means so that when the gate means are closed accumulated charges due to leakage currents are removed from the condensers, and when the gate means are open the output voltage is equal to the instantaneous value of the ratio of the capacity of the transducers to the capacity of the fixed condenser multiplied by a constant factor.

Other objects and advantages of the invention will become apparent during the following discussion of the drawing, wherein is illustrated in schematic diagram form a circuit according to the present invention coupled to a capacitive transducer.

Referring now to the drawing, the transducer 1 is represented by a variable capacitor, the capacity of which is varied in accordance with some physical quantity to be measured (the mechanical coupling of the transistor to such physical quality not being illustrated). The leads from this transducer are coupled to the input of an amplifier enclosed within a dashed-line box labeled 2, the reference numeral 4 indicating the input terminal to this amplifier. The other lead from the transducer 1 is coupled to a terminal 3 which is in turn coupled to a gate circuit located within the dashed box 5. The output terminal of the amplifier 2 bears the reference character 6, and a reference capacitor 7 is coupled between the output terminal 6 of the amplifier and its input terminal 4, this reference capacitor normally serving as a feedback condenser across the amplifier. Moreover, the output terminal 6 and the input terminal 4 are also coupled by a second gate circuit located within a dashed-line box 8, this gate circuit serving to short-circuit the input and output terminals 4 and 6 together when the gate circuit 8 is rendered conductive. The gate circuits 5 and 8 are both coupled to a terminal 9 to which positive input pulses are applied, both gate circuits being simultaneously rendered conductive by and for the duration of each of said positive pulses.

Turning now to the details of the various circuits, the amplifier within the dashed box 2 comprises a conventional direct-coupled amplifier including an input tube 10 having its grid coupled to the terminal 4 and having its plate circuit coupled to a source of positive working potential (not shown) represented by the terminal 12 which is coupled to a source of B-plus. The amplifier also has one other source of direct-current supply represented by the terminal 14 which is maintained at a relatively high negative potential, all voltages being measured with respect to ground or chassis potential. The cathode of the amplifier tube 10 is grounded, and in its plate circuit there is included a decoupling resistor 16 and a decoupling capacitor 18 supplying a substantially constant D.C. potential to the load resistance 20 in the plate of the tube. Since the amplifier is direct-coupled, the output signal from the plate of the amplifier 10 is coupled through a resistance voltage divider chain 22–24 with the grid of the next following tube 26. A peaking capacitor 28 bridges the coupling resistor 22 so as to sharpen the high-frequency coupling between the plate of the tube 10 and the grid of the next stage 26. The plate of the tube 26 is coupled directly to the B-plus terminal 12 but the cathode thereof is returned to the negative terminal 14 of the power supply through an output load resistor 30. In other words, the tube 26 is coupled to the next amplifier tube 32 via the cathode resistance 30. The tube 32 acts as a grounded-grid amplifier fed through its cathode resistor 30, and therefore a voltage divider comprising the resistors 34 and 36 is provided between the negative terminal 14 of the power supply and ground so as to maintain the grid of the tube 32 at the proper operating potential. In addition, a capacitor 38 returns the grid of the tube 32 to ground, since, as stated above, this tube is a grounded-grid amplifier. The output from the tube 32 is taken from a plate load resistor 40 which is direct-coupled to the grid of a final cathode follower amplifier tube 42. A small bypass condenser 44 is connected between this grid and ground for the purpose of insuring that the amplifier will be stable; the amplifier, being a feedback amplifier, can oscillate unless precautions are taken to prevent such oscillations. This last amplifier tube 42 is a cathode follower and therefore its plate is connected directly to the positive power supply terminal 12, and the amplifier output is taken from the cathode of the tube between a cathode resistor 46 which is connected to the negative terminal 14 of the power supply.

As stated above, the reference capacitor 7 which also serves as a feedback capacitor, is applied directly across the input and output amplifier terminals 4 and 6, and so is the gate circuit 8, which comprises a diode switching means which comprises four diodes connected in the form of a wheatstone bridge. These diodes bear the reference characters 50, 52, 54 and 56 and are biased by an R-C circuit including a capacitor 58 and a resistor 60 connected in series with the secondary winding 62 of a transformer having a primary winding 64 to which pulses are fed by way of a terminal 66. The current drawn by the secondary winding 62 of the transformer through the R-C circuit 58–60 creates a potential across the capacitor 58 which normally biases the diodes 50, 52, 54 and 56 in the reverse-bias direction. With the diodes biased in this manner, there is no current conduction between the points A and C of the bridge. However, when a positive pulse is passed through the primary winding 64 of the transformer by a terminal 66 from terminal 9, the positive pulse biases the diodes forwardly, and therefore permits current to pass between the points A and C. The positive pulse is passed through the transformer winding 64 in such a direction as to cause the terminal B to go positive and the terminal D to go negative. This is a type of gate circuit which is known in the prior art, and the applicant therefore does not seek to patent this gate circuit per se. For purposes of the present discussion, it is sufficient to state that the gate circuit is normally blocked between terminals C and A in the absence of a gate pulse, but that the gate 8 is rendered conductive between the terminals A and C during the application of each positive gate pulse to the terminal 9.

The other gate circuit 5 comprises a transistor 70 having its emitter connected to ground and having its collector connected to terminal 3 of the capacitive transducer 1. The transistor 70 is normally biased beyond cutoff, so that no conduction occurs between its emitter and its collector during the absence of positive pulses applied at the terminal 9. The transistor 70 actually illustrated in the present drawing is a NPN transistor, and therefore it can be maintained cut off by the application of a potential which is negative with respect to the ground to the base electrode of the transistor. This is accomplished by means of a voltage divider comprising resistors 72 and 74 which are connected between ground and the negative terminal 14 of the power supply, and which are coupled to the base of the transistor 70 by a diode 76. The output is also coupled by a resistor 78 to the terminal 9 receiving the gate pulses, and the diode 76 is oriented to pass positive gate pulses to the base of the transistor 70 so as to render it conductive during each of these positive pulses. It therefore should be apparent that the transistor 70 is non-conductive between gate pulses applied at terminal 9, but that during each such gate pulse the transistor is rendered strongly conductive so that for practical purposes its resistance may be considered as going to zero whereby the terminal 3 of the transducer 1 is grounded during each positive gate pulse.

The collector of the transistor 70 and the terminal 3 are returned through a resistor 80 to the positive terminal 12 of the power supply, and a diode 82 is coupled from the collector of the transistor 70 to a terminal 84 which is in turn connected with a regulated source of positive potential, which in the illustration of the drawing comprises 28 volts, regulated. This voltage comprises the potential which is multiplied by the ratio of the transducer capacity 1 and the capacity of the reference condenser capacitor 7 in order to obtain the output at terminal 6 of the circuit. It is to be noted that the collector terminal of the transistor 70 and the terminal 3 of the transducer 1 are maintained at 28 volts between positive gate pulses by the fact that the diode 82 draws current through the resistor 80 until the potential at terminal 3 is brought down to precisely 28 volts which equals the potential at terminal 4. On the other hand, when the transistor 70 is short-circuited by the presence of a positive pulse applied to its base, the potential at terminal 3 can drop to zero, but the diode 82 is blocked against flow of current from the regulated 28-volt supply at terminal 84.

*Operation*

As stated above, the capacitive transducer 1 has its capacity varied in accordance with some physical quantity to be measured. The circuit included in the dashed enclosure 2 comprises a conventional direct-coupled amplifier shunted by the feedback capacitor 7 which also functions as a reference capacitor against which the instantaneous capacity of the transducer 1 is compared between positive gate pulses. The amplifier is further shunted by a diode gate circuit 8 which in the absence of a gate pulse is non-conductive between the terminals A and C, but which becomes conductive between these terminals during each positive gate pulse applied at the terminal 9, whereby the gate circuit 8 short-circuits the amplifier 2 during each such gate pulse. The transistor gate circuit 5 is open during each interval between positive gate pulses, but short-circuits the terminal 3 of the capacitive transducer 1 to ground during each positive gate pulse. In other words, during each gate pulse 9 the terminal 3 of the capacitive transducer 1 is grounded, whereas between gate pulses it is connected to 28 volts D.C. regulated. The positive gate pulses are simultaneously applied both to the gate 5 and to the gate 8, and therefore the input terminal 3 of the transducer is connected to ground whenever the output terminal of the amplifier is short-circuited to the input terminal thereof, which comprises the other terminal 4 of the transducer 1. Thus, the output terminal 6 of the amplifier is returned substantially to zero volts, it being short-circuited to the input terminal 4 of the amplifier during each positive pulse, this output voltage becoming equal to the normal grid voltage to the input 10 whenever the gate 8 is conductive between its terminals A and C. On the other hand, in the absence of a gate pulse, both gates 5 and 8 are non-conductive and the amplifier output is not short-circuited to its input which is in turn coupled through the transducer capacitor 1 to the input terminal 3 of the transducer which, between gate pulses, is connected to 28 volts D.C. Therefore, the output voltage of the circuit which is obtained at terminal 6 of the amplifier then becomes equal to the ratio of the capacities of the transducer 1 and the reference capacitor 7 multiplied by 28 volts. Since the 28 volts is regulated and does not vary, and since the capacitor 7 is not varied, the only remaining variable is the capacity of the transducer, which capacity varies according to the position of the phenomenon being measured. Therefore, the present invention provides a circuit which is substantially independent of the other possible variables which frequently plague transducer-coupled circuits.

If desired for greater accuracy, it is possible to use temperature compensated capacities in addition to the regulated reference potential applied to the terminal 84.

The following table provides a list of the circuit components which have been successfully employed in a working implement of the present invention, and which values are presented by way of illustration, rather than by way of limitation.

| | |
|---|---|
| Capacitor 7 | 550 micromicrofarads. |
| Tubes 10 and 42 | Type 6C4. |
| Tubes 26 and 32 | Type 12AT7. |
| Transistor 70 | Type 2N337. |
| Diodes 50, 52, 54, 56, 76 and 82 | Type SG 223. |
| Resistor 16 | 12,000 ohms. |
| Capacitor 18 | .22 microfarad. |
| Resistor 20 | 2700 ohms. |
| Resistor 22 | 330,000 ohms. |
| Resistor 24 | 470,000 ohms. |
| Capacitor 28 | .047 microfarad. |
| Resistor 30 | 39,000 ohms. |
| Resistor 34 | 240,000 ohms. |
| Resistor 36 | 68,000 ohms. |
| Capacitor 38 | .01 microfarad. |
| Resistor 40, 80 | 47,000 ohms. |
| Capacitor 44 | .085 microfarad. |
| Resistor 46 | 60,000 ohms. |
| Capacitor 58 | 10 microfarads. |
| Resistor 60 | 18,000 ohms. |
| Resistor 72, 78 | 3,900 ohms. |
| Resistor 74 | 270,000 ohms. |

The present invention is not to be limited to the exact circuit illustrated in the drawing, for obviously changes may be made therein within the scope of the following claims.

I claim:

1. A circuit to be coupled with capacitive transducer means to deliver an analog voltage proportional to the instantaneous value of capacity thereof, comprising a source of constant potential; reference capacitor means of fixed capacity, said transducer means and said capacitor means being coupled together in series at a common junction; and said transducer and capacitor means being connected to said source of potential; an amplifier connected across one of said means, said amplifier having an input connected with said junction and an output delivering said analog voltage; first switch means for shunting said amplifier when closed; second switch means for shunting, when closed, the potential applied to the other of said means; and control means for simultaneously and periodically closing both switch means.

2. In a circuit as set forth in claim 1, a diode coupled to a first terminal of said constant source on one side and to said other means on its other side and poled to prevent conduction from the source to said other means; a second source of higher potential of the same polarity; a resistance coupling said second source to said other side, said second switch means being connected from said other side to the second terminal of said constant source, the diode preventing flow of current from said constant source through said second switch means when the latter is conductive.

3. In a circuit as set forth in claim 1, both switch means comprising electronic means having conductivities which depend upon input control voltages thereto, and said control means comprising means for coupling periodically-varying control voltage waves to render said electronic means alternately conductive and non-conductive.

4. A circuit to be coupled with a capacitive transducer to deliver an analog voltage proportional to the instantaneous value of capacity thereof, comprising a source of constant potential; a reference capacitor of fixed capacity, said transducer and said capacitor being coupled together in series at a common junction; said transducer and said reference capacitor being connected to said source; an amplifier having input and output terminals connected directly across said capacitor, the input terminal being coupled to said junction and the output terminal delivering said analog voltage; first switch means coupled across said amplifier terminals and when conductive shunting them together; second switch means connected to said transducer and when conductive short-circuiting the potential applied thereto by said source; and control means for simultaneously and periodically rendering both switch means conductive.

5. In a circuit as set forth in claim 4, a diode coupled to a first terminal of said constant source on one side and to said transducer on its other side and poled to prevent conduction from the source to the transducer; a second source of higher potential of the same polarity; a resistance coupling said second source to said other side, said second switch means being connected from said other side to the second terminal of said constant source, the diode preventing flow of current from said constant source through said second switch means when the latter is conductive.

6. In a circuit as set forth in claim 4, both switch means comprising electronic means having conductivities which depend upon input control voltages thereto, and said control means comprising means for coupling periodically-varying control voltage waves to render said electronic means alternately conductive and non-conductive.

7. A circuit for measuring a phyical quantity, comprising first and second capacitor means, each having a pair of terminals with one terminal of each pair being connected to a first common junction, the other terminal of said second capacitor means defining an output for the circuit, an amplifier connected across said second capacitor means and having an input at said first junction and an output at said output for the circuit, first switch means connected across said amplifier, between the input and output thereof, a source of constant potential having a pair of terminals, one of which is connected to the other terminal of said first capacitor means to define a second junction, second switch means connecting said second junction to the other terminal of said source of constant potential, one of said capacitor means having a fixed value and the other of said capacitor means being variable in accord with a quantity to be measured, and control means for periodically closing both of said switch means.

8. The circuit according to claim 7 wherein one terminal of the source of constant potential is defined by connections to separate voltage supplies disposed in parallel, one supply being a grounded, regulated voltage supply and the second being a grounded voltage supply of higher potential than said regulated voltage supply, the connection from said regulated voltage supply to said second junction being through a diode poled to prevent current flow from said regulated voltage supply through said second switch means when the latter is conductive, and the connection from said second voltage supply to said second junction being through a resistance.

9. The circuit according to claim 7 wherein said first capacitor means is variable.

10. A circuit for measuring a physical quantity, comprising a source of constant potential having two terminals, one of which is grounded, first switch means having first and second terminals, said first terminal being connected to the other terminal of said source to define a junction and said second terminal being grounded, whereby said junction may be placed at the potential of said source or at ground potential, dependent upon the condition of said first switch means, variable capacitance transducer means having a pair of terminals, one of which is connected to said junction, fixed capacitance means having a pair of terminals, one of which is connected to the other terminal of said transducer means, an amplifier connected across the terminals of said fixed capacitance means, second switch means connected across the terminals of said fixed capacitance means, and means for periodically closing both of said switch means.

11. In combination, a variable capacitance transducer, a source of constant potential for charging said transducer, and circuit means for converting positional information at said transducer to an output voltage proportional to such position, said source having a pair of terminals and said transducer having a pair of terminals, with one terminal of said source being connected to one terminal of said transducer, said circuit means comprising a reference capacitor having a pair of terminals, one of which is connected to the other terminal of said transducer; an amplifier connected across the terminals of said reference capacitor and serving as a degenerative feedback path thereacross; first switch means connected across the terminals of said reference capacitor; second switch means connected across the terminals of said source;

and control means for simultaneously and periodically closing said first and second switch means.

12. In the combination defined in claim 11, wherein said source of constant potential comprises a first voltage supply and a regulated second voltage supply, each having a pair of terminals and the first voltage supply being of higher potential than the second voltage supply, a resistor connected in series between one terminal of said first voltage supply and said one terminal of the transducer, a diode connected in series between one terminal of said second voltage supply and said one terminal of the transducer and poled to prevent current flow from said second voltage supply when said second switch means is closed.

References Cited by the Examiner

UNITED STATES PATENTS

| | | | |
|---|---|---|---|
| 2,982,868 | 5/51 | Emile | 307—88.5 |
| 3,047,797 | 7/62 | Borsboom | 330—9 |

OTHER REFERENCES

Electronic Analog Computers, Korn and Korn, 2nd edition, pages 23–24, McGraw-Hill Book Co., Inc., 1956.

Pulse and Digital Circuits, Millman and Taub, page 454, McGraw-Hill Book Co., Inc., 1956.

JOHN W. HUCKERT, *Primary Examiner.*

ARTHUR GAUSS, *Examiner.*